US012590269B2

(12) United States Patent　　　　　(10) Patent No.: US 12,590,269 B2
Solano Caballero et al.　　　　　　　 (45) Date of Patent: Mar. 31, 2026

(54) OBTAINING, FORMULATING AND PRODUCING OXIDIZABLE ORGANIC PLANT AND MINERAL CARBON FOR REMEDIATION, RECOVERY, CONDITIONING OF SOIL, SUBSOIL, WATER SOURCES IMPREGNATED WITH FATS, OILS AND HYDROCARBONS

(71) Applicants: Natalia Solano Caballero, Neiva (CO); Tatiana Solano Caballero, Neiva (CO)

(72) Inventors: Natalia Solano Caballero, Neiva (CO); Tatiana Solano Caballero, Neiva (CO)

( * ) Notice: Subject to any disclaimer, the term of this patent is extended or adjusted under 35 U.S.C. 154(b) by 352 days.

(21) Appl. No.: 18/056,737

(22) Filed: Nov. 18, 2022

(65) Prior Publication Data

US 2024/0166970 A1　　May 23, 2024

(51) Int. Cl.
| | |
|---|---|
| *C11D 1/29* | (2006.01) |
| *C09K 3/32* | (2006.01) |
| *C11D 1/62* | (2006.01) |
| *C11D 1/72* | (2006.01) |
| *C11D 1/83* | (2006.01) |
| *C11D 3/30* | (2006.01) |
| *C11D 3/382* | (2006.01) |
| *C11D 1/14* | (2006.01) |
| *C11D 1/75* | (2006.01) |

(52) U.S. Cl.
CPC ................. *C11D 1/83* (2013.01); *C09K 3/32* (2013.01); *C11D 3/30* (2013.01); *C11D 3/382* (2013.01); *C11D 1/146* (2013.01); *C11D 1/72* (2013.01); *C11D 1/75* (2013.01)

(58) Field of Classification Search
CPC .. C11D 1/29; C11D 1/62; C11D 1/665; C11D 1/72; C11D 1/83; C11D 3/382; C09K 3/32
See application file for complete search history.

(56) References Cited

U.S. PATENT DOCUMENTS

| | | | |
|---|---|---|---|
| 8,057,675 B2 | 11/2011 | Baseeth et al. | |
| 8,778,850 B2 | 7/2014 | Andrecola | |
| 10,179,355 B2 | 1/2019 | Smith et al. | |
| 2008/0287324 A1 | 11/2008 | Pursley et al. | |
| 2015/0119300 A1 | 4/2015 | Andrecola | |
| 2018/0305639 A1* | 10/2018 | Argo ..................... | C11D 3/48 |

FOREIGN PATENT DOCUMENTS

CN　　　101735789　　　4/2013

OTHER PUBLICATIONS

Proquimia, "Evolution and characteristics of quaternary ammoniums for surface disinfection", pp. 1-8, Apr. 4, 2022.*

* cited by examiner

*Primary Examiner* — Brian P Mruk
(74) *Attorney, Agent, or Firm* — Patenting Consulting Group; Roberto J Rios

(57) ABSTRACT

The present invention relates to a composition of surfactants that, being part of a negatively charged functional group, have a positive cation to maintain their neutrality, this characteristic present in the surfactants is used for the mixture to be defined and stable, comprising sacha inchi hydrolate, and at least one of bezalkonium chloride to 50%, 5th generation quaternary ammonium at 95%, lauret-7 at 70%, sodium lauryl ether sulfate, cocamidoprolamine oxide, 40% lauryl ether, or mixtures thereof.

7 Claims, 2 Drawing Sheets

FOLLOW-UP TO IMPACTED ZONES OUTSIDE IANR

■ INITIAL TPH (%)　　　□ TPH FOLLOW-UP MONITORING (%)

OBTAINING, FORMULATING AND PRODUCING OXIDIZABLE ORGANIC PLANT AND MINERAL CARBON FOR REMEDIATION, RECOVERY, CONDITIONING OF SOIL, SUBSOIL, WATER SOURCES IMPREGNATED WITH FATS, OILS AND HYDROCARBONS

FIELD OF INVENTION

The present invention relates to compounds and formulations for the remediation of substrates contaminated with hydrocarbons, particularly compounds of organic and inorganic origin for remediation of substrates contaminated with hydrocarbons.

BACKGROUND OF THE INVENTION

Oil contaminated with ubiquitous hydrophobic organic pollutants (HOCs) is a recurring concern around the world arising from their indiscriminate disposal, improper handling, and accidental spills. A wide range of traditional corrective strategies have been common practice. However, these treatment methods have become prohibitive, not environmentally friendly and less accepted by society. Surfactant-enhanced remediation technology represents a cost-effective and environmentally friendly technological alternative for remediating such contaminated sites. Surfactant remediation technologies are carried out in situ or ex situ as two broad categories, or in combination. These technologies include soil washing, washing, phytoremediation and bioremediation. Further applied research continues to quantify the efficiency of the surfactant-enhanced mass transfer phase using a single surfactant solution, while its binary mixtures to remove mixed HOC in soils are also a focus of interest for research.

Due to the great damage caused by soil contamination, there is a growing interest in applying surfactants to the remediation of a variety of contaminated soils around the world. Surfactant-based corrective technologies, adsorption behaviors of surfactants in soil, solubilizing capacity of surfactants, and surfactant toxicity and biocompatibility of surfactants are important considerations. Surfactants can improve desorption of soil contaminants and promote bioremediation of organic compounds by increasing the bioavailability of contaminants. The removal of heavy metals and radionuclides from soils involves the mechanisms of dissolution, complexation associated with surfactants and ion exchange. In addition to conventional ionic and nonionic surfactants, Gemini surfactants and biosurfactants are also applied to soil remediation due to their benign characteristics, such as lower critical micellelle concentration (CMC) values and better biocompatibility. Mixed surfactant systems and the combined use of surfactants with other additives are often adopted to improve the overall performance of the floor wash solution for decontamination. Worldwide, field studies and large-scale remediation using surfactant-based technologies are still limited, however, known cases reveal the good prospect of applying surfactant-based technologies to soil remediation.

Soil, exposed to petroleum pollutants (in the form of gasoline, diesel, gasoline, crude oil, used motor oil), can cause potential damage to the environment, animal and human health. In this review article, we explain the mechanisms of removing contaminants from petroleum oil from the soil using chemical surfactant systems such as surfactant solution, surfactant foam, and nanoparticle-stabilized surfactant foams. Laboratory-based research papers, reported in the last decade, on the application of similar systems for the removal of petroleum contaminants from soil, have been discussed. It is an important fact that the commercial implementation of technology based on chemical surfactants depends on the environmental properties (biodegradability and toxicity) of surfactants. In recent times, surfactant foam and nanoparticle-stabilized surfactant foam are becoming more popular and are considered advantageous over the use of surfactant solution alone.

The state of the art teaches different methods for treating substrates contaminated with hydrocarbons. This is how, for example, the United States patent application No. US2015/0119300, entitled "Nanoemulsion of oil in biodegradable non-acidic water", which is incorporated here in its entirety as a reference, teaches a formula of a natural product as a replacement for the use of traditional methods of acid chemical stimulation for the emulsification, removal and release of paraffins and asphaltenes from wells and reservoirs of low production or pumping with the use of traditional methodologies. Also, a method of use formulation to stimulate an oil well that consists of introducing into the well a biodegradable non-reactive fluid system containing a water-miscible fatty acid solvent, a solution of fatty acids, an amino alcohol and at least one non-reactive fatty acid. -ionic surfactant. The fluid system can also take the form of a nanoemulsion that is formed by combining a colloidal solution with one or more emulsifiers, an alcohol and water. The fluid system can be used in well remediation and stimulation, as well as in additional alternative applications, such as cleaning surface and/or downhole equipment.

U.S. Patent Application No. US2008/0287324, entitled "Well Cleaning Process," which is incorporated here in its entirety by reference, teaches a method for treating an oil or gas well that has a well that includes the steps of forming a solvent-surfactant mixture by combining a solvent and a surfactant. adding a diluent to the solvent-surfactant mixture to form an emulsified mixture of solvent and surfactant; Combine the emulsified solvent-surfactant mixture with a water-based carrier fluid to form a well treatment microemulsion and inject the well treatment microemulsion into the oil or gas well. In a preferred embodiment, the step of forming a solvent-surfactant mixture involves combining a surfactant with a solvent selected from the group consisting of terpenes and alkyl or aryl esters of short-chain alcohols.

Likewise, U.S. Pat. No. 8,778,850, entitled "Biodegradable non-reactive oil well stimulation fluid and method of use", which is incorporated here in its entirety as a reference, discloses a formula of a natural product as a replacement for the use of traditional methods of acid chemical stimulation for the emulsification, removal, and release of paraffins and asphaltenes from wells and reservoirs of low production or pumping with the of traditional methodologies. Also, a method of using formulation to stimulate an oil well that consists of introducing into the well a biodegradable non-reactive fluid system containing a water-miscible fatty acid solvent, a solution of fatty acids, an amino alcohol and at least one non-reactive fatty acid. -ionic surfactant. The fluid system can also take the form of a nanoemulsion that is formed by combining a colloidal solution with one or more emulsifiers, an alcohol and water. The fluid system can be used in well remediation and stimulation, as well as in additional alternative applications, such as cleaning surface and/or downhole equipment.

On the other hand, U.S. Pat. No. 10,179,355, entitled "Bioremediation enhancing agents and methods of use", which is incorporated here in its entirety as a reference, teaches a method for treating contaminated water or other contaminated media. Bioremediation enhancing agents (BEAs), such as yeast metabolites (YM) and other yeast products, are used to facilitate microbial treatment of contaminated material. Polysaccharides are also an effective BEA when used alone or in combination with yeast products. BEAs can work with microbes and electron donors to improve the rate of contaminant degradation and increase the efficiency of electron donor utilization. Several novel electron donors are also described.

Similarly, U.S. Pat. No. 8,057,675, entitled "Water Remediation Methods", which is incorporated here in its entirety as a reference, teaches methods for the bioremediation of contaminants in water using soapy paste, an acidic oil of soapy paste, a neutralized acid oil of soapy paste or combinations thereof. Systems for bioremediation are also described. A method for the remediation of water which has a contaminant, including this method: bringing a composition into contact with that water, comprising such composition: a lipid reserve selected from the group consisting of soapy paste, an acidic oil of soapy paste, a neutralized acid oil of soapy paste and any combination thereof; and a compound selected from the group consisting of an emulsifier, a lactate ester, a lactate polymer, a polyhydric alcohol, carboxylic acids, carboxylic acid salts and any combination thereof; where such water is selected from the group consisting of groundwater, wastewater, stormwater, runoff water, surface water and any combination thereof.

Finally, China's patent application No. CN101735789, entitled "Foam Compound Oil Displacement Agent and Foam Preparation Method", which is incorporated here in its entirety as a reference, teaches an oil displacement agent composed of foam comprising the following components as a percentage by weight: agent A containing 50-70% urea, 10-30% ammonium chloride and 8-25% acid-producing substance, agent B containing 30-70% urea, 10-30% ammonium chloride and 8-25% acid-producing substance, 60% nitrite, 8-35% sodium dichloroisocyanurate, 10-20% surfactant and 10-20% polymer. The foam composite oil displacement agent provided by the foam composite oil displacement invention enters the stratum or rock well, the gas is produced by chemical reaction under stratum conditions, the surfactant and polymer in the oil displacement agent are coordinated and a massive foam is formed in the stratum, The foam generated is stable and evenly distributed, the gas produced by the solution's own reaction instead of the external gas is used to form foam, which simplifies the construction process and the device.

Despite the above, there is still a need in the state of the art for new compositions for the treatment and bioremediation of substrates in order to remove hydrocarbon residues.

DESCRIPTION OF THE INVENTION

Figure 1:
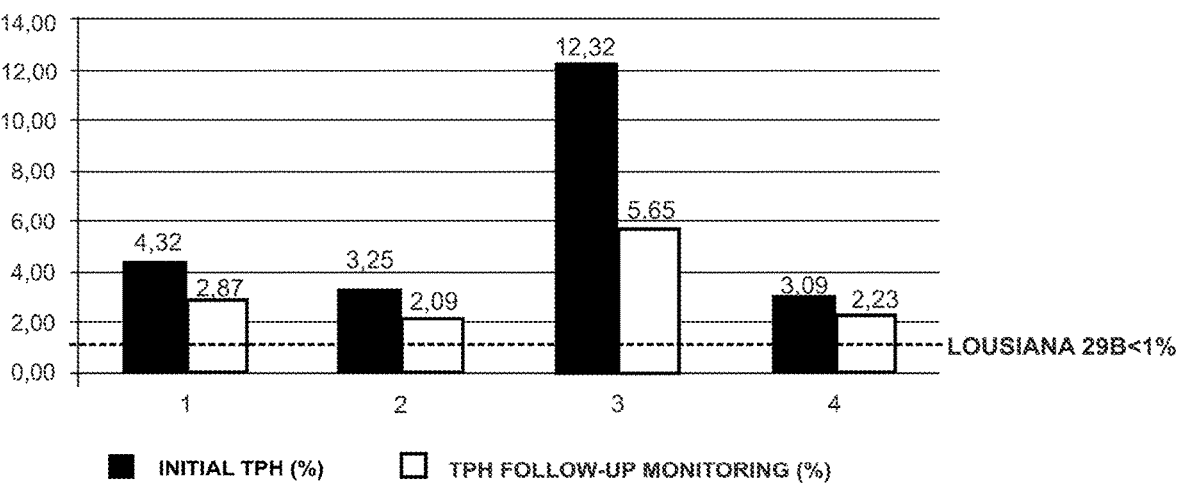
FIG. 1 corresponds to example of the efficiency in the of in the swamp of San Silvestre, located in the department of Santander in Colombia of a formulation according to a modality of the present invention.
Figure 2:
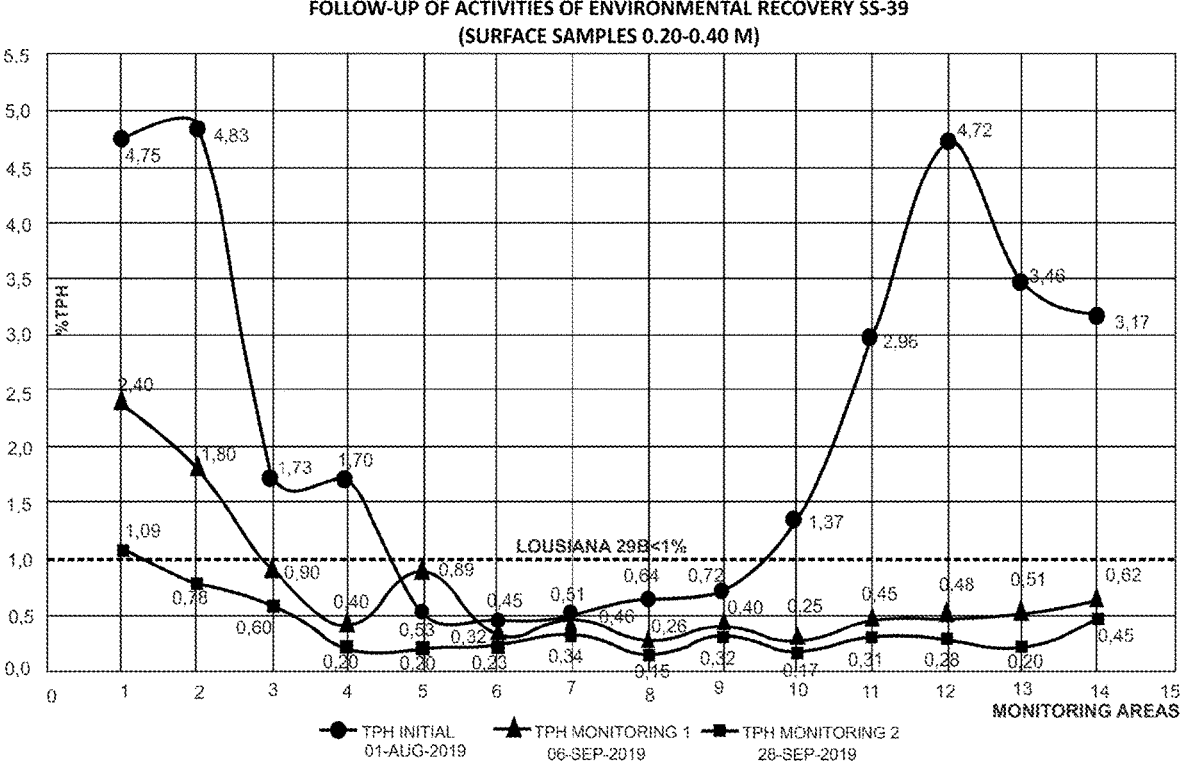
FIG. 2 corresponds to a graph of the performance of a composition according to another modality of the present invention, in the Serrania de las Quintas, municipality of Puerto Boyaca, department of Boyaca in Colombia.

The present application relates to a composition of surfactants that, being part of a negatively charged functional group, have a positive cation to maintain their neutrality, this characteristic present in the surfactants is used for the mixture to be defined and stable.

Another particularity or similarity that the different compounds of the mixture have is that they have a nonpolar part composed of alkyl radicals and the polar portion consists of different carboxylate groups, sulfonates, sulfate, phosphates among others.

On the other hand, cationic surfactants have a positively charged functional group and to maintain electric neutrality they are loaded with negative ion the polar portion are generally quaternary ammoniums and the nonpolar portion are different alkyl groups, cationic surfactants are absorbed at liquid interfaces and interact with the cell membrane of microorganisms present in the soil contaminated with oil and its derivatives, In addition to being efficient antimicrobial agents, some biocides, since their discovery are used for disinfection in hospitals and the food industry, but have not been tested in the oil industry in order to degrade or break the hydrocarbon chains to environmental conditions.

Different tests were carried out with each of the components of the mixture, the result obtained confirms that separately none of the components of the mixture manages to break or divide the chains of hydrocarbons or their derivative, with this it is confirmed that without the mixture in its different proportions there is no generation of invention.

In the soil there is a number of negative charges such as minerals and organic compounds (clay, organic matter, or humic substances) and that if they are suspended in the soil they are found as cations (Ca, Mg, Na, K, $NH_4$ etc.) that the surface retains, these cations when in contact with the mixture are exchanged by other cations or hydrogen ions from the hydrocarbon chains when the soil has been contaminated with the hydrocarbon hence the ability of the mixture to have different types of polar and non-polar bonds.

About 100 years ago the ammonium molecule was discovered as a biocide, disinfectant, surfactant, cleaner function, among others, this mixture takes the ammonium with the different groups of radicals possessed in different types of bonds, so that the mixture as a stable anionic function can break the long chains of the hydrocarbon and its derivatives.

Currently petroleum as a compound of many carbon chains must be subjected to different variables such as pressures, temperatures among others and is refined (separation of fractions of carbon molecules) and thus obtain by-products, with technological innovation the application of the mixture to oil is carried out achieving instantly a change a fracturing of carbon molecules at room temperature and pressure, resulting in an Oreo emulsion where oil can be mixed with water and traveled in the aqueous phase.

Our innovation ensures for the first time the breaking of the surface and interfacial tension of water, this being the universal solvent, for this reason our technology will reach surfaces and subsoil of all the ecosystems intervened.

By joining all the listed components, a new generation of quaternary ammonium is created, making this technology a pioneer in the remediation, restoration, recovery, recovery, mobilization of organic compounds found in hydrocarbons, fats and oils.

The present invention teaches a formulation comprising sacha inchi hydrolate, and at least one of 50% benzalkonium chloride, 5th generation quaternary ammonium 95%, lauret-7 70%, sodium lauryl ether sulfate, cocamidoprolamine oxide, 40% lauryl ether, or mixtures thereof.

The hydrolate of Sacha inchi comes from the ribbing of Sacha Inchi, which after being cultivated and shelling the fruit, the rib is carefully selected and then the mixture with drinking water is subjected to a distillation by steam dragging. Provides calcium, magnesium and oxidizable carbon anions of vegetable origin is the mutual solvent that allows the mixture to be stable and balanced, provides oxidizable carbons of anionic character that allows the bond with the carbon chains of petroleum by its bond affinity.

Benzalkonium chloride has a slow antiseptic action in low doses is bacteriostatic and in high doses bactericidal, has a low surface tension and has emulsifying properties. The 5th generation quaternary ammonium has a mechanism that consists of penetrating and breaking the cytoplasmic membrane, degrading amino acids and polymer chain causing cell lysis.

disinfection in hospitals and the food industry, but in no way have they been tested in the oil industry seeking to degrade or break the hydrocarbon chains to environmental conditions.

Different tests were carried out with each of the components of the mixture, the result obtained confirms that separately none of the components of the mixture manages to crack or split the chains of hydrocarbons or their derivative, with this it is confirmed that without the mixture in its different proportions there is no generation of invention.

The following tables compare the physicochemical properties of the invention mixture, results of laboratories accredited by ONAC internationally, with those of other commercially available substances, such as bioenzymes and mixtures of surfactants.

| QUALIFICATION CHEMICAL COMPOSITION | | |
|---|---|---|
| BIOENZIMES | ORGANIC MINERAL/INVENTION | SURFACTANTS |
| 1) Water 80-90% | SACHA INCHI HYDROLATE | Sodium dodecyl benzene sulfonate |
| 2) Nitrogen (urea) 0.01-0.09% | BENZALKONIUM CHLORIDE 50% | Abiotic acid |
| 3) Molasses 1-2% | 5 GENERATION QUATERNARY AMMONIUM AT 95% | Dimethyl ether of phosphonic tetradecyl acid |
| 4) Bio Surfactant 0.06-0.08% | LAURET-7 AT 70% | Polyethoxylated octyl phenol |
| 5) Sugar 1.5%-2% | SODIUM LAURYL ETHER SULFATE | Lauryl monoethanol amide |
| 6) Protease 0.01-0.03% | COCAMIDOPROLAMINE OXIDE | Glycerol diester |
| 7) Amylase 0.01-0.03% | LAURIL ETER 40% | Monoester of sorbitan |
| 8) Malta 1-2% | DRINKING WATER | Dodecyl betaine |

Lauret-7 has an emulsifying power in low doses that allows to break the surface tension of the water allowing the mixture of the carbon chains to be dissolved in the water.

Sodium lauryl ether sulfate, being surfactant has the faculty that, through decomposition, they provide a gas that is absorbed by the reactant medium generating foam.

Cocamidoprolamine oxide is a type of surfactant with a wide variety of desirable properties, has a high compatibility with cationic, anionic, and nonionic surfactants, with capacity in terms of foam stabilization, thickening, conditioning and static electricity resistance; therefore, it significantly and comprehensively improves the performance of many washing products.

Finally, lauryl ether is selected for its cleaning property, it displaces any substance from a surface.

The previous compounds named in the list share several functions anionic surfactants being part of a negatively charged functional group have a positive cation to maintain their neutrality, this characteristic present in the surfactants is used for the mixture to be defined and stable.

Another particularity or similarity that the different compounds of the mixture have is that they have a nonpolar part composed of alkyl radicals and the polar portion consists of different carboxylate groups, sulfonates, sulfate, phosphates among others.

On the other hand, cationic surfactants have a positively charged functional group and to maintain electric neutrality they are loaded with negative ion the polar portion are generally quaternary ammoniums and the nonpolar portion are different alkyl groups, cationic surfactants are absorbed at liquid interfaces and interact with the cell membrane of microorganisms present in the soil contaminated with oil and its derivatives, In addition to being efficient antimicrobial agents, some biocides, since their discovery are used for This table makes visible the differences or egalitarian characteristics between bioenzymes, invention and surfactants, highlighting the novelties, innovation and especially the efficiency of mineral organic invention. Surfactants are of chemical origin, which generates limitations such as saturation, inhibition, and toxicity of the microbial population, when contact is made with protected ecosystems.

| SOLUBILITY | | |
|---|---|---|
| BIOENZIMES | ORGANIC MINERAL/INVENTION | SURFACTANTS |
| H2O | H2O | H2O |
| | ALCOHOL | ALCOHOL |
| | | ETHER |

With regard to solubility, it is clear that all three cases are soluble in water and other solvents, which opens advantages of application and attention, in the case of the mineral organic invention, there are no restrictions on making solubility with fresh water bodies, (from the same spill), bodies with high concentrations of water, which forms a great advantage of attention to remote sites where raw water cannot be moved for the attention of on-site remediations.

| DILUTION PERFORMANCE WITH H2O | | |
|---|---|---|
| BIOENZIMES | ORGANIC MINERAL/INVENTION | SURFACTANTS |
| 4 of $H_2O$ by 1 of OSEI TREATMENT IN RAW WATER, OCEANS, RIVER, STREAMS, SOILS (ADDING H2O) | 9 of $H_2O$ by 1 of MIXTURE RAW WATER, OCEANS, RIVER, STREAMS, HEAVY TOOLS, PAVEMENT, WATER TREATMENT PLANTS, MUD CUTTING POOLS, ON ANY SURFACE, WITH POTENTIAL DOWNHOLE AND TAR SANDS FOR IMPROVED RECOVERY. | 5 of $H_2O$ by 1 of surfactant THEY SHOULD BE APPLIED IN LOW CONCENTRATION IN DRINKING WATER, RIVERS, OCEANS, SOILS; THEY CAN BE HARMFUL TO ECOSYSTEMS. |
| THE FINAL PRODUCT IS STABLE AS LONG AS THE QUALITY OF THE WATER TO BE USED IN THE DILUTION OF THE PRODUCT IS GUARANTEED. | DISSOLVES IN ANY TYPE OF WATER ONLY IF THE WATER CONTAINS HIGH CONCENTRATION OF TOTAL HARDNESS ITS LOW DILUTION | , |

With the performance characteristic it can be observed that the commonly used surfactants have a saturation and limited performance, this is due to the braking solubility between these, unlike the mineral organic invention, the yields and dilutions with water are wide, being able to apply dilutions in areas where the concentration of hydrocarbons are below 1% contributing to the total degradation of hydrocarbons, A big difference with the bio enzymes and surfactants found on the world market today. We can also provide that the invention does not generate saturations, precipitates, or leachate of the measurement process, which if it registers the surfactants and bio enzymes used in the market, this because its micellar composition allows each component not to oxidize the others and each of these perform their work.

The most outstanding characteristic among bio-enzymes, surfactants and mineral organic invention, is that the latter does not generate, nor does it register after studies in different ecosystems, traces of ecotoxicity, which others do. This confirms that the invention makes differences within the remediation carried out to date with innovation points that are registered with total success.

| EFFICIENCY OF BIOREMEDIATION | | |
|---|---|---|
| BIOENZIMES | ORGANIC MINERAL/INVENTION | SURFACTANTS |
| 60% | 100% | 60% |

Regarding the efficiency in the remediation processes, by results and traceable data and history, it was obtained that the mineral organic invention registers 100% of the degradation and remediation in ecosystems of the treated hydrocarbons, this makes an advantage in innovation.

| RECOVERY OF FATS OR HYDROCARBONS | | |
|---|---|---|
| BIOENZIMES | ORGANIC MINERAL/INVENTION | SURFACTANTS |
| UNABLE TO RECOVER | THE % RECOVERY OF HYDROCARBONS OR FATS IS 40% | UNABLE TO RECOVER |

Within the characteristics studied in parallel with the solutions present in the markets to carry out the bio remeasurement processes, we can ensure that the innovation registers this characteristic of recovery of fats or hydrocarbons in 40% this generates a competitive advantage, being able to capture the weighs of the hydrocarbon chains and establish the complete removal of the treated ecosystems.

| TOXICITY | | |
|---|---|---|
| BIOENZIMES | ORGANIC MINERAL/INVENTION | SURFACTANTS |
| IN LOW AND MODERATE CONCENTRATIONS, IT IS NOT TOXIC | NON-TOXICITY | IN LOW AND MODERATE CONCENTRATIONS, IT IS NOT TOXIC |

The solutions found in the market saturate the ecosystems with the presence of hydrocarbons, which generates increases in the percentages of ecotoxicity of the areas, which affects the fauna and flora, weakening their growth, the mineral organic invention as a great difference, does not generate traces of these ecotoxicities which has been able to generate work with species in the process of extension, protected areas, paramos, springs among other ecosystems susceptible to the application of surfactants or bio enzymes.

The process of bioremediation in soils contaminated with hydrocarbon capacities, carried out with surfactants, is conditioned by the physiological of the microorganisms, the chemical structure of the hydrocarbon, the type of surfactant and the environmental factors of the soil. Applying surfactants in a bioremediation can act by increasing the bioavailability of the hydrocarbon through the parallel action of desorption and solubilization of the contaminant, allowing mass transfer and biodegradation. But it can also act in an inhibition and/or toxicity of the microbial population.

The synergy in surfactant mixtures and the efficiency of washing is a function of the type of surfactant, in many investigations, mixtures (mixed solutions) are used to improve washing efficiency and reduce unexpected side effects, such as precipitation or loss of surfactant due to adsorption in the soil.

In most cases when the different types of surfactants are deliberately mixed, what is sought is synergy, i.e. the condition when the properties of the mixture are superior to those achieved with the individual components themselves (thereby improving the desorption efficiency of the hydrocarbon), therefore, synergy is the molecular change energy of the mixture of different surfactants. Anionic and cationic surfactant models often tend to form precipitates as a consequence of no practical value. A typical characteristic of mixing an ionic (anionic/cationic) with a nonionic is the synergy or anti-synergy (antagonism) at the interfaces (liquid/liquid or liquid/solid), this mixture can also increase or decrease the CMC.

| ADDED VALUE | | |
|---|---|---|
| BIOENZIMES | ORGANIC MINERAL/ INVENTION | SURFACTANTS |
| SOILS LOSE TPH CONCENTRATION. | THE SOILS IN ADDITION TO LOSING THP CONCENTRATION, PERFORM SOIL CONDITIONING, WITH THE POSSIBILITY OF PLANTING IN THE AREA. | THE PROCESS OF BIOREMEDIATION IN SOILS CONTAMINATED WITH HYDROCARBONS, CARRIED OUT WITH SURFACTANTS, IS MICROORGANISMS, THE PHYSIOLOGICAL OF THE CONDITIONED BY THE CHEMICAL STRUCTURE OF THE HYDROCARBON, THE TYPE OF SURFACTANT AND THE ENVIRONMENTAL FACTORS OF THE SOIL. |

As for the added values of the invention in parallel we can validate that the degradation of hydrocarbons is 100% and that the affected ecosystems are immersed back into natural productive life, which until now the present market solutions had not been able to achieve.

In the soil there is a number of negative charges such as minerals and organic compounds (clay, organic matter or humic substances) and that if they are suspended in the soil they are found as cations (Ca, Mg, Na, K, NH4 etc.) that the surface retains, these cations when in contact with the mixture are exchanged by other cations or hydrogen ions from the hydrocarbon chains When the soil has been contaminated with the hydrocarbon there is the ability of the mixture to have different types of polar and non-polar bonds.

| MIXTURE OF ORGANIC CARBON VEGEL AND MINERAL MCOV | | | | | | | | | |
|---|---|---|---|---|---|---|---|---|---|
| | | SMA 1 | | | ARG 2 | | | | |
| | 1 | 2 | 3 | 7 | 4 | 5 | 6 | WATER | |
| SMA1/ARG2 10:90 AM | 10% SMA 1 | | | | 90% ARG 2 | | | | |
| | 26.627 | 0.734 | 0.399 | 0.816 | 6.54 | 6.366 | 5.742 | 53.255 | 100.479 |
| SMA1/ARG2 30:70 | 30% SMA 1 | | | | 70% ARG 2 | | | | |
| | 26.627 | 2.204 | 1.197 | 2.45 | 5.086 | 4.951 | 4.466 | 53.255 | 100.236 |
| SMA1/ARG2 50:50 | 50% SMA 1 | | | | 50% ARG 2 | | | | |
| | 26.627 | 3.674 | 1.996 | 4.084 | 3.633 | 3.536 | 3.19 | 53.255 | 99.995 |

| MIXTURE OF ORGANIC CARBON VEGEL AND MINERAL MCOV | | | | | | | | | |
|---|---|---|---|---|---|---|---|---|---|
| | | SMA 1 | | | ARG 2 | | | | |
| | # 1 | # 2 | # 3 | # 7 | # 4 | # 5 | # 6 | | WATER |
| | | | UNITS OF MEASUREMENT | | | | | | |
| | L | L | Kg | Kg | Kg | Kg | Kg | Kg | L |
| SMA1/ARG2 10:90 | 5257.65 | 1400 | 38.64 | 20.991 | 42.945 | 343.862 | 334.722 | 301.943 | 2800 |
| SMA1/ARG2 30:70 | 5257.65 | 1400 | 115.92 | 62.972 | 128.835 | 267.448 | 260.339 | 234.845 | 2800 |
| SMA1/ARG2 50:50 | 5257.65 | 1400 | 193.2 | 104.953 | 214.725 | 191.034 | 185.957 | 167.746 | 2800 |

In the table the characterizations of each component of the mixture were made and the different portions and combinations that have been working on the application of the mixture for the remediation of soils contaminated with hydrocarbons were taken, as observed there are stable percentages of component #1 and water, it is because the mixture must be dissolved in a greater proportion of hydrolate and water.

Soil organic carbon is thus produced; vegetation fixes the carbon of the atmosphere by photosynthesis transporting it to living and dead matter of plants. Soil organisms break down this matter by transforming it into Soil Organic Matter (MOS). The carbon is released from the biomass for the MOS, when a contamination with oil or some derivative occurs this MOS are impregnated and causes the hydrocarbon a suffocation of the MOS, with the characterization of the soil and the amount of TPH'S present in the soil we can formulate how much mixture should be applied and in what proportions. In the following table are reflected the different quantities and proportions handled in the process hydrocarbon remediation.

The invention claimed is:

1. A composition for remediation of substrates contaminated with hydrocarbons and other organic compounds, said composition comprising: sacha inchi hydrolate, a solution of benzalkonium chloride 50% wt %, a solution of 5th generation quaternary ammonium 95% wt %, and a solution of laureth-7 70% wt %.

2. The composition according to claim 1, further comprising a solution of lauryl ether 40% wt %.

3. The composition according to claim 1, further comprising sodium lauryl ether sulfate.

4. The composition according to claim 1, further comprising cocamidopropylamine oxide.

5. The composition according to claim 1, comprising from 1-30% by volume of said sacha inchi hydrolate, from 0.1-2% by volume of said solution of benzalkonium chloride, 0.1-3% by volume of said solution of 5th generation quaternary ammonium, 0.1-1.5% by volume of said solution of laureth-7, 0.1-5% by volume of sodium lauryl ether sulfate, 0.1-5% by volume of cocamidopropylamine oxide, 0.1-5% by volume of a solution of lauryl ether 40% wt % and water to complete 100% of the volume.

MIXTURE OF ORGANIC CARBON VEGEL AND MINERAL MCOV RANGE OF PERCENTAGES OF USE OF COMPOUNDS IN THE MIXTURE ACCORDING TO NEED

| UNITS OF MEASUREMENT | | | SMA 1 | | | ARG 2 | | | |
|---|---|---|---|---|---|---|---|---|---|
| | % | # 1 % | # 2 % | # 3 % | # 7 % | # 4 % | # 5 % | # 6 % | WATER % |
| SMA1/ ARG2 | 100 | 10.00 @ 40.00 | 0.10 @ 6.00 | 0.10 @ 3.50 | 0.50 @ 5.50 | 7.00 @ 5.20 | 7.00 @ 3.00 | 6.00 @ 2.00 | 8.00 @ 60.00 |

| TPH RANGE OR CONCENTRATION | DILUTION OR MIXING | DAYS OF DEGRADATION | VOLUME TREATED |
|---|---|---|---|
| 2% TPH to 20% TPH | 9 PPM H2O to 1 | 30 days | From 1 m 3 |
| 21% TPH to 30% TPH | PPM Composition | | to 8 m$^3$ |
| 31% TPH to 40% TPH | 6 PPM H2O to 1 | 40 days | |
| 41% TPH to 50% TPH | PPM Composition | | |
| 51% TPH to 60% TPH | 4 PPM H2O to 1 | 90 days | |
| 61% TPH to 70% TPH | PPM Composition | | |
| 71% TPH to 80% TPH | 2 PPM H2O to 1 | 130 days | |
| 81% TPH to 100% TPH | PPM Composition | | |

The previous table shows the percentages used to make the different mixtures of the components, used according to the types of soil, the types of water once hydrocarbon content analysis is carried out.

Although up to now a description of some modalities of the present invention has been made, the average technician will appreciate that it is possible to make variations and modifications to them without departing from the spirit of the invention. Therefore, the examiner is kindly reminded that this description is not of a limiting nature and that the subject matter and scope of the subject matter to be protected will be defined according to the claims accompanying this description.

6. The composition according to claim 1, comprising from 1-30% by volume of said sacha inchi hydrolate, from 0.1-2% by volume of said solution of benzalkonium chloride, 0.1-3% by volume of said solution of 5th generation quaternary ammonium, 0.1-1.5% by volume of said solution of laureth-7, 0.1-5% by volume of sodium lauryl ether sulfate, 0.1-5% by volume of cocamidopropylamine oxide and 0.1-5% by volume of a solution of lauryl ether 40% wt %.

7. The composition according to claim 1, further comprising water.

* * * * *